United States Patent
Knaapen et al.

(10) Patent No.: US 9,674,919 B2
(45) Date of Patent: Jun. 6, 2017

(54) LIGHTING FIXTURE WITH TOUCH-SENSITIVE LIGHT EMITTING SURFACE

(71) Applicant: PHILIPS LIGHTING HOLDING B.V., Eindhoven (NL)

(72) Inventors: Bram Knaapen, Eindhoven (NL); Bartel Marinus Van De Sluis, Eindhoven (NL); Anthonie Hendrik Bergman, Eindhoven (NL); Tim Dekker, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 319 days.

(21) Appl. No.: 14/407,301

(22) PCT Filed: Jun. 13, 2013

(86) PCT No.: PCT/IB2013/054853
§ 371 (c)(1),
(2) Date: Dec. 11, 2014

(87) PCT Pub. No.: WO2013/186737
PCT Pub. Date: Dec. 19, 2013

(65) Prior Publication Data
US 2015/0123569 A1    May 7, 2015

Related U.S. Application Data

(60) Provisional application No. 61/659,481, filed on Jun. 14, 2012.

(51) Int. Cl.
*H05B 33/08* (2006.01)
*F21S 10/02* (2006.01)
(Continued)

(52) U.S. Cl.
CPC ............ *H05B 33/0872* (2013.01); *F21S 4/15* (2016.01); *F21S 10/02* (2013.01); *F21V 23/0485* (2013.01);
(Continued)

(58) Field of Classification Search
CPC .. H05B 33/0872; H05B 33/0896; F21S 10/02
See application file for complete search history.

(56) References Cited

U.S. PATENT DOCUMENTS 7,140,751 B2 * 11/2006 Lin ..................... H05B 33/0803
362/231
2002/0159267 A1 * 10/2002 Hao ........................ H03K 17/96
362/394
(Continued)

FOREIGN PATENT DOCUMENTS

| CN | 201903839 U | 7/2011 |
|---|---|---|
| EP | 2416338 A1 | 2/2012 |

(Continued)

*Primary Examiner* — Elmito Breval
(74) *Attorney, Agent, or Firm* — Meenakshy Chakravorty

(57) ABSTRACT

Disclosed are methods and apparatus related to a LED-based lighting fixture having a touch-sensitive light emitting surface that may be touched by a user to change light output characteristics of LEDs of the lighting fixture. The LED-based lighting fixture may include a flexible touch-sensitive layer and a flexible light emitting layer having a plurality of individually controllable LED groups. Touch events may be detected via input from the flexible touch-sensitive layer and at least one light output characteristic of the LED groups altered in correspondence with the touch events.

19 Claims, 5 Drawing Sheets

(51) Int. Cl.
*F21V 23/04* (2006.01)
*G06F 3/041* (2006.01)
*F21S 4/15* (2016.01)
*F21Y 101/00* (2016.01)

(52) U.S. Cl.
CPC ....... G06F 3/0412 (2013.01); H05B 33/0803 (2013.01); H05B 33/0863 (2013.01); H05B 33/0896 (2013.01); *F21Y 2101/00* (2013.01)

(56) References Cited

U.S. PATENT DOCUMENTS

| | | |
|---|---|---|
| 2006/0202638 A1 | 9/2006 | Kubota et al. |
| 2007/0046640 A1 | 3/2007 | Oon et al. |
| 2007/0093290 A1 | 4/2007 | Winans et al. |
| 2008/0225520 A1* | 9/2008 | Garbus .................... G01J 3/46 362/231 |
| 2010/0060601 A1 | 3/2010 | Oohira |
| 2010/0302169 A1* | 12/2010 | Pance .................... G06F 3/0237 345/170 |
| 2011/0089857 A1 | 4/2011 | Diederiks |
| 2012/0012448 A1* | 1/2012 | Pance .................... H01H 13/83 200/5 A |
| 2012/0013490 A1* | 1/2012 | Pance .................... G06F 3/0202 341/28 |
| 2012/0092271 A1 | 4/2012 | Liu et al. |
| 2012/0098751 A1* | 4/2012 | Liu ....................... G06F 3/0202 345/170 |
| 2013/0194199 A1* | 8/2013 | Lynch .................... G06F 3/0412 345/173 |

FOREIGN PATENT DOCUMENTS

| | | |
|---|---|---|
| JP | 2007531142 A | 11/2007 |
| JP | 2008542834 A | 11/2008 |
| WO | 0055879 A1 | 9/2000 |
| WO | 2011007325 A1 | 1/2011 |
| WO | 2011062085 A1 | 5/2011 |

* cited by examiner

LIGHTING FIXTURE WITH TOUCH-SENSITIVE LIGHT EMITTING SURFACE

CROSS-REFERENCE TO PRIOR APPLICATIONS

This application is the U.S. National Phase application under 35 U.S.C. §371 of International Application No. PCT/IB2013/054853, filed on Jun. 13, 2013, which claims the benefit of U.S. Provisional Patent Application No. 61/659,481, filed on Jun. 14, 2012. These applications are hereby incorporated by reference herein.

TECHNICAL FIELD

The present invention is directed generally to a lighting fixture with a touch-sensitive light emitting surface. More particularly, various inventive methods and apparatus disclosed herein relate to a LED-based lighting fixture having a touch-sensitive light emitting surface that may be touched by a user to change light output characteristics of LEDs of the lighting fixture.

BACKGROUND

Digital lighting technologies, i.e. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

Lighting fixtures, such as LED-based lighting fixtures, have been implemented that enable groups of light sources in the lighting fixtures to be individually controlled. For example, LED-based lighting fixtures may include a plurality of LED segments, each containing one or more LEDs, that may be individually controlled (e.g., segments that may be individually turned on/off). A controller may be utilized to individually control each of the LED segments. Although such LED-based lighting fixtures enable individualized control of LED segments, the user interface to interact with the controller may have one or more drawbacks. For example, the user interface may not enable control via touch interaction between the user and the lighting fixture. Also, for example, the user interface may not enable use with a lighting fixture that contains flexible and/or adjustable lighting sources, such as a lighting fixture with a flexible and adjustable sheet of LEDs.

Thus, there is a need in the art to provide lighting fixtures with a touch-sensitive light emitting surface that optionally overcomes one or more drawbacks of existing lighting fixtures.

SUMMARY

The present disclosure is directed to inventive methods and apparatus for a LED-based lighting fixture having a touch-sensitive light emitting surface that may be touched by a user to change light output characteristics of LEDs of the lighting fixture. For example, the LED-based lighting fixture may include a flexible touch-sensitive layer and a flexible light emitting layer having a plurality of individually controllable LED groups. Touch events may be detected via input from the flexible touch-sensitive layer and at least one light output characteristic of the LED groups altered in correspondence with the touch events.

Generally, in one aspect, a touch-sensitive LED-based lighting fixture is provided and includes: a flexible light emitting layer having a plurality of individually controllable LED groups, each of the LED groups including at least one LED; a flexible diffusing layer provided over the flexible light emitting layer and diffusing light output generated by the LED groups; a flexible touch-sensitive layer; a flexible protective layer provided over the flexible light emitting layer, the flexible diffusing layer, and the flexible touch-sensitive layer; and a controller in electrical communication with the flexible touch-sensitive layer and the flexible light emitting layer, the controller detecting touch events via input from the flexible touch-sensitive layer and directing at least one light output characteristic of the LED groups in correspondence with the touch events.

In some embodiments, the flexible touch-sensitive layer is interposed between the flexible diffusing layer and the flexible protective layer. In some versions of those embodiments, the flexible touch-sensitive layer is segmented into a plurality of touch-sensitive areas each provided over and enabling control of a corresponding of the LED groups. In some versions of those embodiments the flexible touch-sensitive layer includes a conductive foil divided into a plurality of separated segments to define the plurality of touch-sensitive areas. In some versions of those embodiments the flexible touch-sensitive layer includes a conductive film atop a conductive foil, the conductive film divided into a plurality of segments to define the plurality of touch-sensitive areas.

In some embodiments, the flexible touch-sensitive layer is integrated with the flexible light emitting layer. In some versions of those embodiments the flexible touch-sensitive layer includes a plurality of LED sub-mounts supporting the LED of said LED groups and including integrated touch keys. In some versions of those embodiments, the flexible touch-sensitive layer includes a plurality of wires interconnecting the LED of the LED groups, the plurality of wires including integrated touch keys.

In some embodiments, the controller determines a locationally corresponding LED group of the LED groups via input from the flexible touch-sensitive layer and directs the at least one light output characteristic of the locationally corresponding LED group.

In some embodiments, the flexible touch-sensitive layer is integrated with the flexible diffusing layer. In some versions of those embodiments, the flexible diffusing layer includes a textile and the flexible touch-sensitive layer is woven into the textile. In some versions of those embodiments the flexible diffusing layer includes a textile and the flexible touch-sensitive layer is painted on the textile.

In some embodiments, the flexible touch-sensitive layer includes predefined touch-sensitive areas, the touch-sensitive areas corresponding in number to the LED groups.

Generally, in another aspect, a touch-sensitive LED-based lighting fixture is provided and includes: a flexible light emitting layer having a plurality of individually controllable LED groups, each of the LED groups including at least one LED; a flexible touch-sensitive layer physically segmented into a plurality of touch-sensitive areas; and a controller in electrical communication with the flexible touch-sensitive layer and the flexible light emitting layer, the controller detecting touch events via input from the flexible touch-sensitive layer and directing at least one light output characteristic of the LED groups in correspondence with the touch events.

In some embodiments, the flexible touch-sensitive layer includes a conductive foil divided into a plurality of separated segments to define the plurality of touch-sensitive areas.

In some embodiments, the flexible touch-sensitive layer includes a conductive film atop a conductive foil, the conductive film divided into a plurality of segments to define the plurality of touch-sensitive areas.

In some embodiments, each of the touch-sensitive areas is provided over and enables control of a corresponding of the LED groups.

In some embodiments, the lighting fixture further includes a flexible diffusing layer provided over the flexible light emitting layer and diffusing light output generated by the LED groups. In some version of those embodiments, the lighting fixture further includes an outermost flexible protective layer provided over the flexible light emitting layer and the flexible touch-sensitive layer.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultraviolet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term).

Accordingly, the terms "different colors" implicitly refer to multiple spectra having different wavelength components and/or bandwidths. It also should be appreciated that the term "color" may be used in connection with both white and non-white light.

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various embodiments, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some embodiments, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "user interface" as used herein refers to an interface between a human user or operator and one or more devices that enables communication between the user and the device(s). Examples of user interfaces that may be employed in various embodiments of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Lighting fixtures, such as LED-based lighting fixtures, have been implemented that enable groups of light sources in the lighting fixtures to be individually controlled. Although such lighting fixtures enable individualized control of groups of light sources, the user interface of such lighting fixtures may have one or more drawbacks. For example, the user interface may not enable control via touch interaction between the user and the lighting fixture. Also, for example, the user interface may not enable use with a lighting fixture that contains flexible and/or adjustable lighting sources, such as a lighting fixture with a flexible and adjustable sheet of LEDs. Thus, Applicants have recognized and appreciated a need in the art to provide a lighting fixture with a touch-sensitive light emitting surface that optionally overcomes one or more drawbacks of existing lighting fixtures. To that end, the invention generally focuses on methods and apparatus related to a LED-based lighting fixture having a touch-sensitive light emitting surface that may be touched by a user to change light output characteristics of LEDs of the lighting fixture.

In view of the foregoing, various embodiments and embodiments of the present invention are directed to a lighting fixture with a touch-sensitive light emitting surface.

Figure 1A:
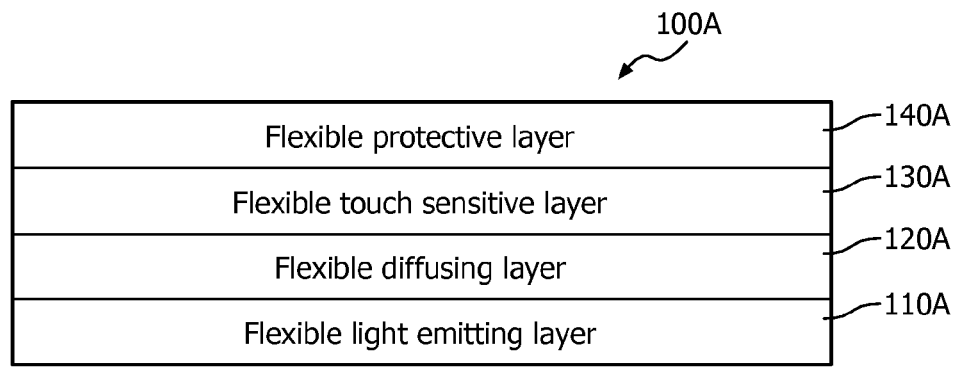
FIG. 1A illustrates an embodiment of a touch-sensitive LED-based lighting fixture.

Referring initially to FIG. 1A, an embodiment of a touch-sensitive LED-based lighting fixture 100A is illustrated. The LED-based lighting fixture 100A includes a flexible light emitting layer 110A, a flexible diffusing layer 120A atop the flexible light emitting layer 110A, a flexible touch-sensitive layer 130A atop the flexible diffusing layer 120A, and a flexible protective layer 140A atop the flexible touch-sensitive layer 130A.

The flexible light emitting layer 110A may include a plurality of electrically powered LED light sources that are flexible and/or deformable relative to one another. For example, in some embodiments the flexible light emitting layer 110A may include a metal mesh wire that electrically and/or mechanically interconnects LED light sources and enables the position of the LED light sources to be flexible relative to one another and/or fixedly deformable relative to one another. For instance, the metal mesh wire may be fixedly deformable by a user to a plurality of shapes thereby enabling a plurality of adjustments to the position of the LED light sources relative to one another. Such metal mesh wire may be arranged in two dimensions (flat) or may optionally be flexed and/or fixedly deformed into three dimensions (e.g., formed to fit over a pre-existing structure, formed into a three dimensional shape, temporarily flexed).

Figure 2:
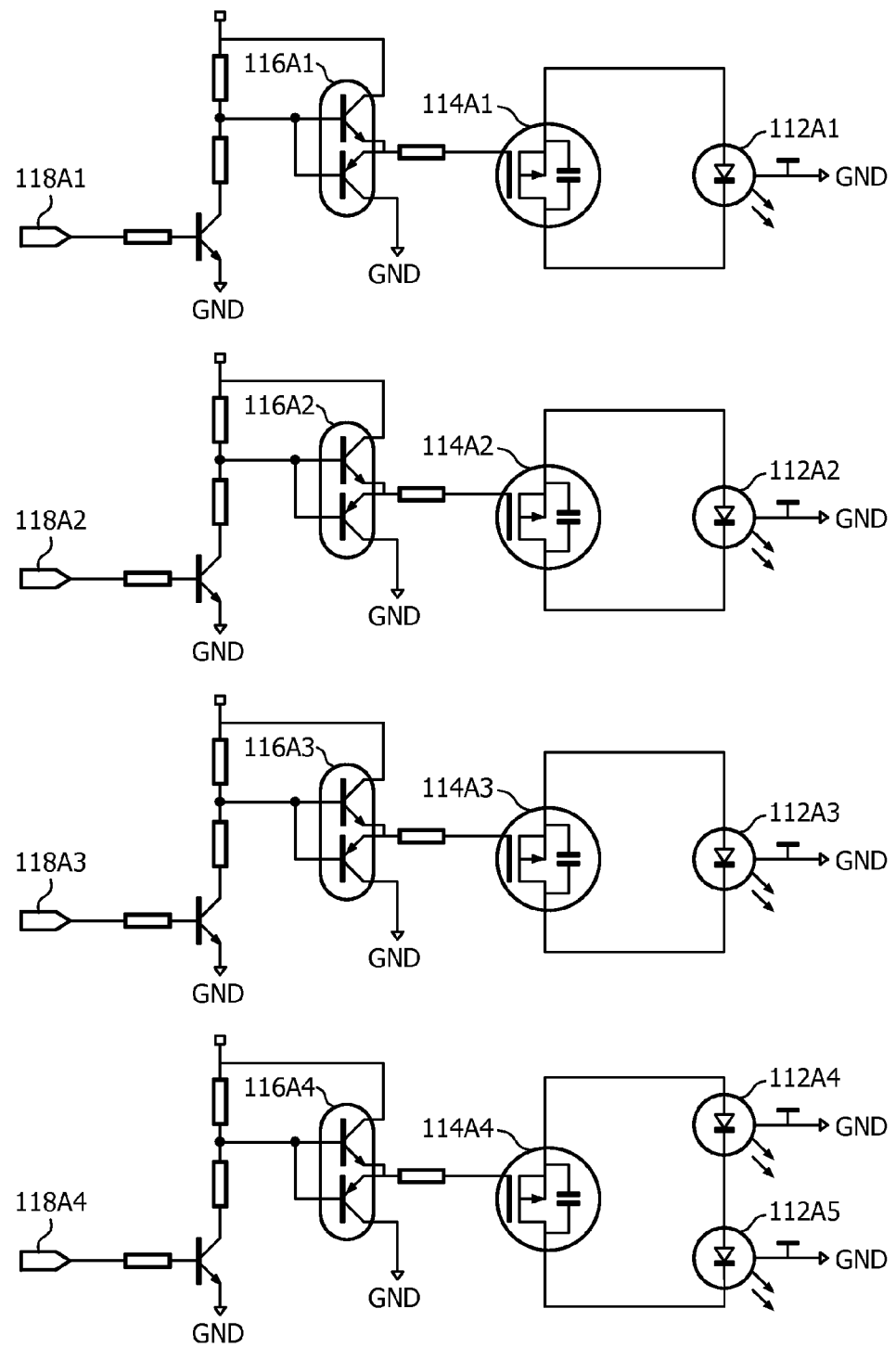
FIG. 2 illustrates a schematic of aspects of example driving circuitry of a light emitting layer of a touch-sensitive LED-based lighting fixture.

In some embodiments, the flexible light emitting layer 110A may be mechanically and/or electronically separated into multiple groups of LEDs, with each of the groups of LEDs defining an individually controllable group of LEDs. For example, the flexible light emitting layer 110A may be cut to define one or more desired shapes of groups of LEDs with each group of LEDs containing at least one LED and being individually controllable. Also, for example, groups of LEDs may each include at least one LED and be electrically individually controllable. For example, groups of LEDs may be controlled as separate grids, with arrays of LEDs arranged in a series-parallel configuration. Also, for example, groups of LEDs in series may be controlled by using field-effect transistors (FETs) connected in parallel with one or more LEDs of the groups of LEDs to selectively short circuit the LEDs connected in parallel with the FETs. For example, with reference to FIG. 2, four LED groups may be provided: a first group including first LED 112A1, a second group including second LED 112A1, a third group including third LED 112A3, and a fourth group including fourth and fifth LEDS 112A4, 112A5. The LEDs of each of the LED groups is controlled by a corresponding FET 114A1-A4. The FETs 114A1-A4 are controlled by corresponding transistors 116A1-A4 that are controlled via respective inputs 118A1-A4 from a controller. The state of each of the FETs 114A1-A4 may be individually manipulated to either short LEDs of the corresponding LED grouping (turning the LEDs "off") or to allow powering of the LEDs of the corresponding LED grouping (turning the LEDs "on").

The flexible diffusing layer 120A may include a material that at least partially diffuses light output that is generated by the light emitting layer 110A. The flexible diffusing layer 120A may be flexible and/or deformable. For example, the flexible diffusing layer 120A may conform to any shape fixed via the flexible light emitting layer 110A. In some embodiments, the flexible diffusing layer 120A is a continuous layer of translucent material. In some embodiments, the flexible diffusing layer 120A may be translucent and/or opaque and have multiple openings therethrough. In some embodiments the flexible diffusing layer 120A is a textile such as, for example, an animal textile, a plant textile, a mineral textile, and/or a synthetic textile. In some embodiments the flexible diffusing layer 120A may be omitted.

The flexible touch-sensitive layer 130A may enable a touch from a user to be sensed and communicated to a controller as described herein. In some embodiments, the flexible touch-sensitive layer 130A may be a capacitive touchscreen. In some embodiments the flexible touch-sensitive layer 130A may optionally include a thin strip of plastic foil with a thin, transparent layer of indium tin oxide (ITO) atop the plastic foil. In some embodiments a diffusing layer may be included atop the layer of ITO to diffuse any projection of visible other components of the touch-sensitive layer 130A. In some embodiments the touch-sensitive layer 130A may incorporate an alternative and/or additional touch screen technology such as, for example, resistive technology, surface acoustic wave technology, infrared technology, optical imaging technology, dispersive signal technology, and/or acoustic pulse recognition technology. The flexible touch-sensitive layer 130A may, in response to a user's touch, alter at least one characteristic that may be provided to a controller. In response to receiving the input from the touch-sensitive layer 130A, the controller may identify a group of LEDs that corresponds to the input and change at least one characteristic of the identified LED group. For example, the controller may determine the location of the touch based on input from the flexible touch-sensitive layer 130A and change the on/off state of one or more LEDs that correspond with the touch location. Also, for example, the controller may determine the touch-sensitive layer area from which the touch originated and change the on/off state of one or more LEDs of a LED group that corresponds to the touch-sensitive layer area.

In some embodiments, the flexible touch-sensitive layer 130A may be separated into a plurality of touch-sensitive areas. The touch-sensitive areas may optionally be provided over and enable control of corresponding LED groups of the flexible light emitting layer 110A. In some embodiments the separated areas may be formed by segmenting a foil in a capacitive touchscreen. For example, the foil may be cut and/or formed to conform to the shape of a corresponding LED group. An uncut translucent ITO layer may optionally be placed atop the cut and/or formed foil. The gaps between the foil segments may assist with the flexibility and/or 3D formability of the LED-based lighting fixture 100A by providing bending points for the touch-sensitive layer 130A. In some embodiments, the separated areas may additionally or alternatively be formed by segmenting a translucent conducting layer atop the foil. For example, a transparent layer such as ITO may be formed into multiple segments, leaving areas without ITO between the multiple segments. An uncut foil layer may optionally be placed under the multiple segment ITO layer. The gaps between the segmented groups may assist with the flexibility and/or 3D formability of the LED-based lighting fixture 100A by providing bending points for the touch-sensitive layer 130A.

The flexible protective layer 140A may be a transparent protective surface provided to protect the flexible touch-sensitive layer 130A. In some embodiments the flexible protective layer 140A may be a flexible plastic. The flexible protective layer 140A may prevent moisture and/or debris from affecting the flexible touch-sensitive layer 130A and/or may prevent a user from inadvertently damaging the flexible touch-sensitive layer 130A. In some embodiments the flexible protective layer 140A may be omitted.

Figure 1B:
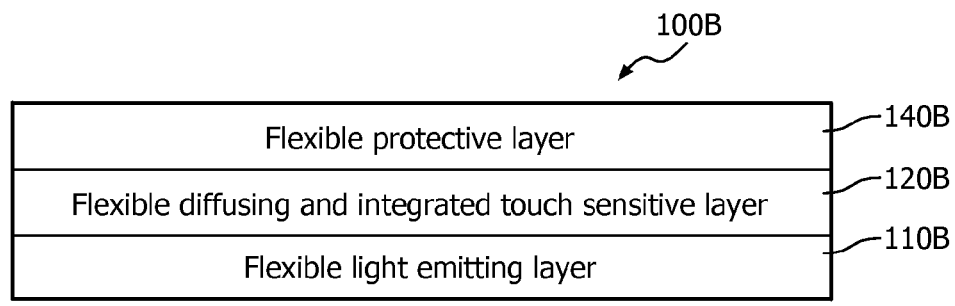
FIG. 1B illustrates another embodiment of a touch-sensitive LED-based lighting fixture.

FIG. 1B illustrates another embodiment of a touch-sensitive LED-based lighting fixture 100B. The LED-based lighting fixture 100B includes a flexible light emitting layer 110B, a flexible diffusing and integrated touch-sensitive layer 120B atop the flexible light emitting layer 110B, and a flexible protective layer 140B atop the flexible diffusing and integrated touch-sensitive layer 120B.

The flexible light emitting layer 110B may include a plurality of electrically powered LED light sources that are flexible and/or deformable relative to one another. The flexible light emitting layer 110B and the flexible light emitting layer 110A may share one or more common aspects and discussion herein pertaining to flexible light emitting layer 110A may be applicable to flexible light emitting layer 110B. For example, in some embodiments the flexible light emitting layer 110B may include a metal mesh wire that electrically and/or mechanically interconnects LED light sources and enables the position of the LED light sources to be flexible relative to one another and/or fixedly deformable relative to one another. In some embodiments the flexible light emitting layer 110B may be mechanically and/or electronically separated into multiple groups of LEDs, with each of the groups of LEDs defining an individually controllable group of LEDs.

The flexible diffusing and integrated touch-sensitive layer 120B may include a material that at least partially diffuses light output that is generated by the light emitting layer 110B. The flexible diffusing and integrated touch-sensitive layer 120B may be flexible and/or deformable. For example, the flexible diffusing and integrated touch-sensitive layer 120B may conform to any shape fixed via the flexible light emitting layer 110B. In some embodiments the flexible diffusing and integrated touch-sensitive layer 120B may include a continuous layer of translucent material. In some embodiments the flexible diffusing and integrated touch-sensitive layer 120B may be translucent and/or opaque and have multiple openings therethrough. In some embodiments the flexible diffusing and integrated touch-sensitive layer 120B may include a textile such as, for example, an animal textile, a plant textile, a mineral textile, and/or a synthetic textile.

The flexible diffusing and integrated touch-sensitive layer 120B integrates a touch-sensitive layer therein. In some embodiments the integrated touch-sensitive layer is a capacitive touch-sensitive layer. In some embodiments conductive ink may be painted on textile of the flexible diffusing and integrated touch-sensitive layer 120B and enable a touch from a user to be sensed and communicated to a controller as described herein. In some embodiments a conductive yarn may additionally or alternatively be sewed into textile of the flexible diffusing and integrated touch-sensitive layer 120B and enable a touch from a user to be sensed and communicated to a controller as described herein. The conductive yarn and/or paint may enable flexibility and/or 3D formability of the LED-based lighting fixture 110B by providing bending points for the flexible diffusing and integrated touch-sensitive layer 120B.

In some embodiments, at least the touch-sensitive aspect of the flexible diffusing and integrated touch-sensitive layer 120B may be separated into a plurality of touch-sensitive areas. The touch-sensitive areas may optionally be provided over and enable control of corresponding LED groups of flexible light emitting layer 110B. In some embodiments the separated areas may be formed by utilizing conductive paint and/or conductive yarn only in desired areas. For example, conductive yarn may only be sewed into those areas that define separated areas and that optionally overlay corresponding LED groups.

The flexible protective layer 140B may be a transparent protective surface provided to protect other layers. In some embodiments, the flexible protective layer 140B may be a flexible plastic. The flexible protective layer 140B may prevent moisture and/or debris from affecting the flexible diffusing and integrated touch-sensitive layer 120B and/or may prevent a user from inadvertently damaging the flexible diffusing and integrated touch-sensitive layer 120B. In some embodiments the flexible protective layer 140B may be omitted.

Figure 1C:
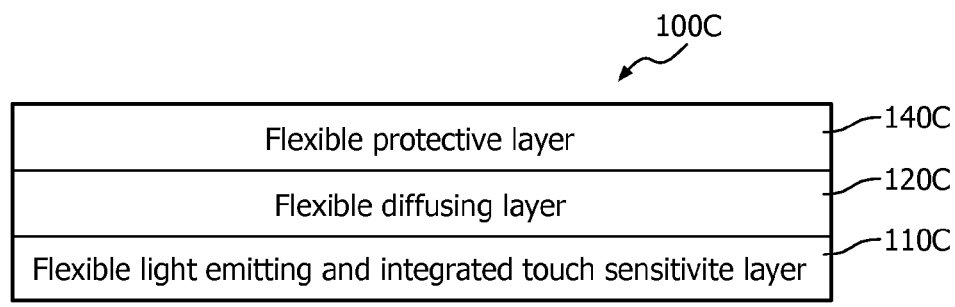
FIG. 1C illustrates another embodiment of a touch-sensitive LED-based lighting fixture.

FIG. 1C illustrates another embodiment of a touch-sensitive LED-based lighting fixture 100C. The LED-based lighting fixture 100C includes a flexible light emitting and integrated touch-sensitive layer 110C, a flexible diffusing layer 120C atop the flexible light emitting and integrated touch-sensitive layer 110C, and a flexible protective layer 140C atop the flexible diffusing layer 120C.

The flexible light emitting and integrated touch-sensitive layer 110C may include a plurality of electrically powered LED light sources that are flexible and/or deformable relative to one another. Light emitting aspects of the flexible light emitting and integrated touch-sensitive layer 110C and may share one or more common aspects with the flexible light emitting layers 110A and/or 110B and aspects of discussion herein pertaining to flexible light emitting layers 110A and/or 110B may be applicable to flexible light emitting and integrated touch-sensitive layer 110C. For example, in some embodiments flexible light emitting and integrated touch-sensitive layer 110C may include a metal mesh wire that electrically and/or mechanically interconnects LED light sources and enables the position of the LED light sources to be flexible relative to one another and/or fixedly deformable relative to one another. In some embodiments the flexible light emitting and integrated touch-sensitive layer 110C may include LEDs that are mechanically and/or electronically separated into multiple groups of LEDs, with each of the groups of LEDs defining an individually controllable group of LEDs.

Figure 3:
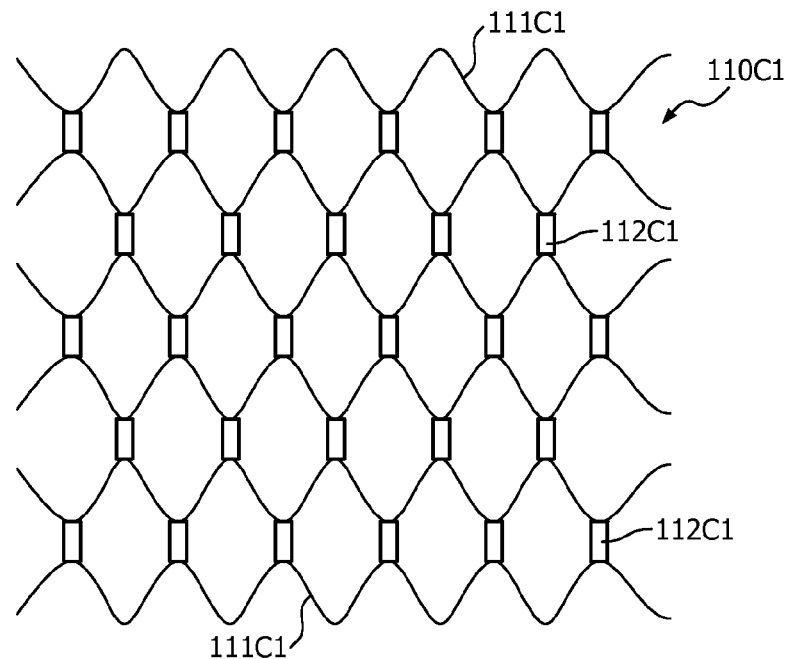
FIG. 3 illustrates an example of a light emitting and touch-sensitive layer of a touch-sensitive LED-based lighting fixture.

The flexible light emitting and integrated touch-sensitive layer 110C integrates a touch-sensitive layer therein. In some embodiments the wire mesh that electrically and/or mechanically interconnects LEDs may be a touch key in a capacitive based touch-sensitive technology. A user may touch the wire mesh and cause a change in measured capacitance that may be analyzed by a controller to determine which LEDs to manipulate in response to the touch. The capacitive measurement may take place when the LEDs are turned off (e.g., either completely turned off or during an off cycle during pulse width modulation of the LEDs). FIG. 3 illustrates an example of a flexible light emitting and integrated touch-sensitive layer 110C1 having wire mesh 111C1 that electrically and mechanically interconnects LEDs 112C1. The wire mesh 111C1 is also a touch key in a capacitive based touch-sensitive technology and, when touched by a user, causes a location specific measurable change in capacitance.

Figure 4:
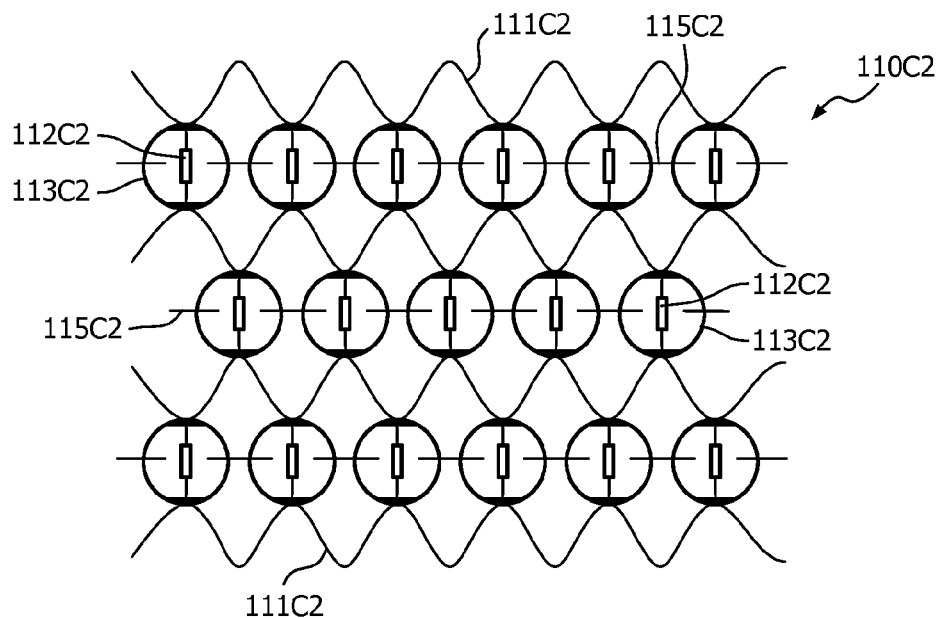
FIG. 4 illustrates another example of a light emitting and touch-sensitive layer of a touch-sensitive LED-based lighting fixture.

In some embodiments, LEDs of the flexible light emitting and integrated touch-sensitive layer 110C may be provided on sub-mounts that include integrated touch keys to provide a touch-sensitive technology. For example, referring to FIG. 4, an example of a flexible light emitting and integrated touch-sensitive layer 110C is illustrated that includes LED sub-mounts 113C2 that include integrated touch keys. Each individual LED 112C2 has been placed on top of a sub-mount 113C2 such as a small PCB. A small area of conductive material (e.g., copper) is provided around the LEDs 112C2 and an interconnecting wire 115C2 is provided through the middle of the sub-mounts 113C2 connecting the conductive material. The LED sub-mounts 113C2 that include integrated touch keys may enable a plurality of individual touch-sensitive areas to be created. For example, in FIG. 3 three separate horizontal touch-sensitive areas are provided.

The flexible diffusing layer 120C may include a material that at least partially diffuses light output that is generated by the flexible light emitting and integrated touch-sensitive layer 110C. The flexible diffusing layer 120C may be flexible and/or deformable. For example, the flexible diffusing layer 120C may conform to any shape fixed at the flexible light emitting and integrated touch-sensitive layer 110C. In some embodiments the flexible diffusing layer 120C is a continuous layer of translucent material. In some embodiments the flexible diffusing layer 120C may be translucent and/or opaque and have multiple openings therethrough. In some embodiments the flexible diffusing layer 120C is a textile such as, for example, an animal textile, a plant textile, a mineral textile, and/or a synthetic textile. In some embodiments the flexible diffusing layer 120C may be omitted.

The flexible protective layer 140C may be a transparent protective surface provided to protect other layers. In some embodiments the flexible protective layer 140C may be a flexible plastic. The flexible protective layer 140C may prevent moisture and/or debris from affecting the flexible light emitting and integrated touch-sensitive layer 110C and/or may prevent a user from inadvertently damaging the flexible light emitting and integrated touch-sensitive layer 110C. In some embodiments the flexible protective layer 140C may be omitted.

Figure 5:
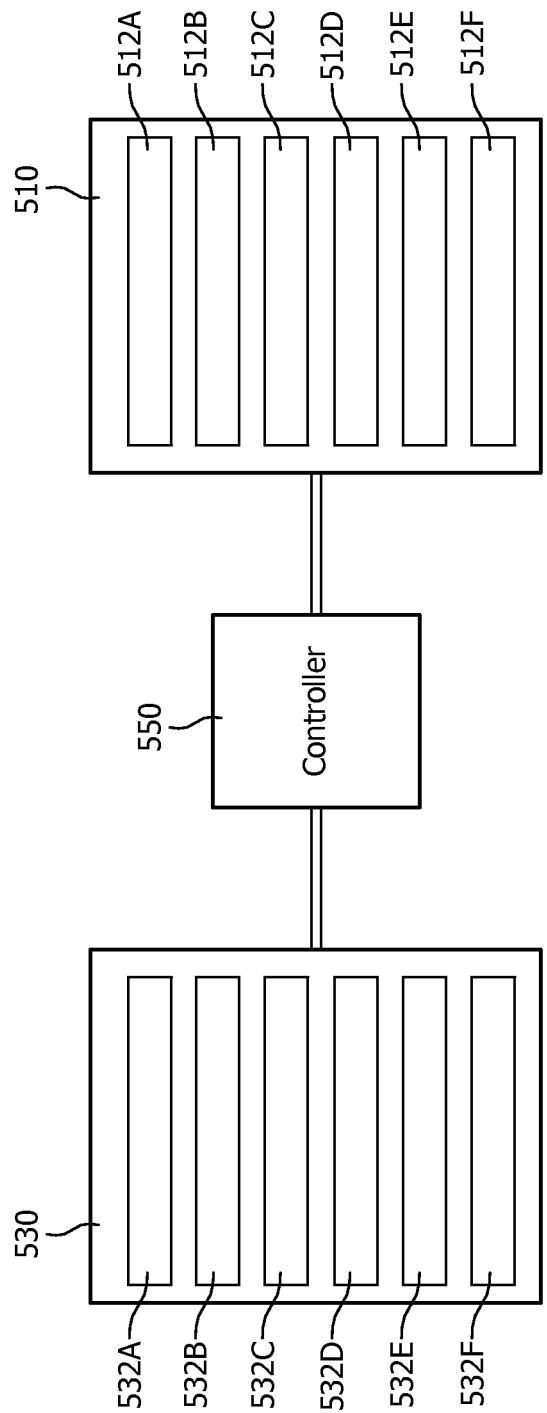
FIG. 5 illustrates a block diagram of another embodiment of a touch-sensitive LED-based lighting fixture.

Referring to FIG. 5, a block diagram of another embodiment of a touch-sensitive LED-based lighting fixture is illustrated. The touch-sensitive LED-based lighting fixture includes a light emitting layer 510, a touch-sensitive layer 530, and a controller 550 in electrical communication with the light emitting layer 510 and the touch-sensitive layer 530. Although the light emitting layer 510, touch-sensitive layer 530, and controller 550 are illustrated apart from one another in FIG. 5, it is understood that the touch-sensitive layer 530 may overlay the light emitting layer 510. Also, the controller 550 may optionally be incorporated in one of the layers 510, 530 and/or alternatively provided separate from the layers 510, 530.

The light emitting layer 510 includes a plurality of LED groups 512A-F. Each of the LED groups 512A-F may include one or more LEDs. Each of the LED groups 512A-F is controllable independently of the other LED groups 512A-F via controller 550. For example, each of the LED groups 512A-F may be turned on/off independently of the other LED groups 512A-F and/or may have one or more additional light output characteristics (e.g., color, brightness) that may be adjusted independently of the other LED groups 512A-F.

The touch-sensitive layer 530 includes a plurality of touch-sensitive areas 532A-F. Each of the touch-sensitive areas 532A-F substantially corresponds in shape and location to a corresponding of the LED groups 512A-F. Each of the touch-sensitive areas 532A-F may be positionally overlaid atop a corresponding of the LED groups 512A-F. Touching of one of the touch-sensitive areas 532A-F may cause an output to be generated by the touch-sensitive layer 530 that is provided to the controller 550. The controller 550 will analyze the input from the touch-sensitive layer and determine which of the LED groups 512A-F should be adjusted in response to the input. The controller 550 then generates an appropriate output to effectuate adjustment of the appropriate LED groups 512A-F (e.g., directly and/or via communication with a driver). For example, the controller 550 may analyze the input to determine the touch occurred at touch-sensitive area 532A and determine one or more characteristics of LED group 512A should be adjusted in response.

Figure 6:
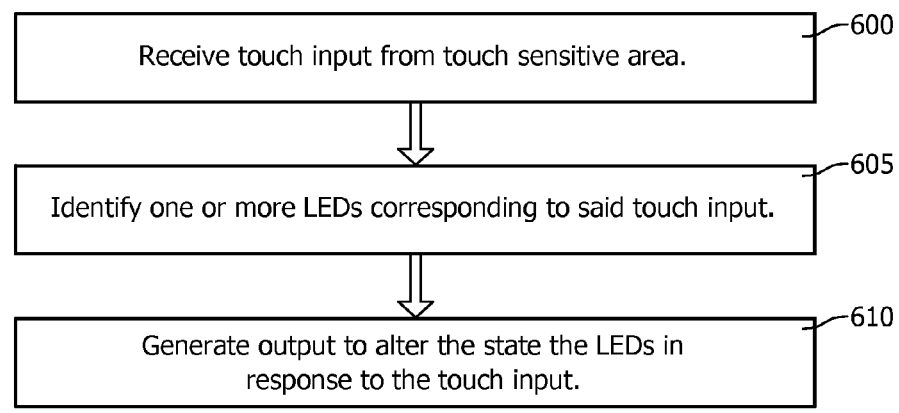
FIG. 6 illustrates an embodiment of a method of adjusting light output of LEDs in response to a touch input at a touch-sensitive area.

FIG. 6 illustrates an embodiment of a method of adjusting light output of LEDs in response to a touch input at a touch-sensitive area. Other embodiments may perform the steps in a different order, omit certain steps, and/or perform different and/or additional steps than those illustrated in FIG. 6. In some embodiments a controller, such as controller 550, may perform the steps of FIG. 6. At step 600 touch input is received from a touch-sensitive area. For example, the controller 550 may receive touch input originating from touch-sensitive area 532A of touch-sensitive layer 530. At step 605 one or more LEDs corresponding to the touch input are identified. For example, the controller 550 may identify that the LED group 512A corresponds the touch-sensitive area 532A. At step 610 output is generated to alter the state of the identified one or more LEDs in response to the touch input. For example, the controller 550 may communicate with a driver to have the driver send appropriate signals to turn on the one or more LEDs of the LED group 512A.

In some embodiments, of a touch-sensitive LED-based lighting fixture, segmented touch-sensitive areas may only partly overlay segmented light emitting groups. For example, a LED-based lighting fixture may include a light emitting area having eight light emitting strips. The light emitting strips may taper down in size and a smaller section thereof overlaid by a touch-sensitive area having a plurality of touch-sensitive strips. An individual of the touch-sensitive strips may be touched by a user to alter the characteristics of the entire corresponding of light emitting strips it is partially provided over. For instance, the touch-sensitive strip may be touched to turn on or off LEDs of light emitting strip, including LEDs that are beneath the touch-sensitive strip and LEDs that are not beneath the touch-sensitive strip. The touch-sensitive strips may enable interaction with the other parts of the light emitting area that are out of reach for direct touch.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed.

Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Also, reference numerals appearing in the claims, if any, are provided merely for convenience and should not be construed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A touch-sensitive LED-based lighting fixture, comprising:
   a flexible light emitting layer having a plurality of individually controllable LED groups, each of said LED groups including at least one LED;
   a flexible diffusing layer provided over said flexible light emitting layer and diffusing light output generated by said LED groups;
   a flexible touch-sensitive layer;
   a flexible protective layer provided over said flexible light emitting layer, said flexible diffusing layer, and said flexible touch-sensitive layer; and
   a controller in electrical communication with said flexible touch-sensitive layer and said flexible light emitting layer, said controller detecting touch events via input from said flexible touch-sensitive layer and directing at least one light output characteristic of said LED groups in correspondence with said touch events.

2. The LED-based lighting fixture of claim 1, wherein said flexible touch-sensitive layer is interposed between said flexible diffusing layer and said flexible protective layer.

3. The LED-based lighting fixture of claim 2, wherein said flexible touch-sensitive layer is segmented into a plurality of touch-sensitive areas each provided over and enabling control of a corresponding of said LED groups.

4. The LED-based lighting fixture of claim 3, wherein said flexible touch-sensitive layer includes a conductive foil divided into a plurality of separated segments to define said plurality of touch-sensitive areas.

5. The LED-based lighting fixture of claim 3, wherein said flexible touch-sensitive layer includes a conductive film atop a conductive foil, said conductive film divided into a plurality of segments to define said plurality of touch-sensitive areas.

6. The LED-based lighting fixture of claim 1, wherein said flexible touch-sensitive layer is integrated with said flexible light emitting layer.

7. The LED-based lighting fixture of claim 6, wherein said flexible touch-sensitive layer includes a plurality of LED sub-mounts supporting said LED of said LED groups and including integrated touch keys.

8. The LED-based lighting fixture of claim 6, wherein said flexible touch-sensitive layer includes a plurality of wires interconnecting said LED of said LED groups, said plurality of wires including integrated touch keys.

9. The LED-based lighting fixture of claim 1, wherein said controller determines a locationally corresponding LED group of said LED groups via input from said flexible touch-sensitive layer and directs said at least one light output characteristic of said locationally corresponding LED group.

10. The LED-based lighting fixture of claim 1, wherein said flexible touch-sensitive layer is integrated with said flexible diffusing layer.

11. The LED-based lighting fixture of claim 10, wherein said flexible diffusing layer includes a textile and said flexible touch-sensitive layer is woven into said textile.

12. The LED-based lighting fixture of claim 10, wherein said flexible diffusing layer includes a textile and said flexible touch-sensitive layer is painted on said textile.

13. The LED-based lighting fixture of claim 1, wherein said flexible touch-sensitive layer includes predefined touch-sensitive areas, said touch-sensitive areas corresponding in number to said LED groups.

14. A touch-sensitive LED-based lighting fixture, comprising:
   a flexible light emitting layer having a plurality of individually controllable LED groups, each of said LED groups including at least one LED;
   a flexible touch-sensitive layer physically segmented into a plurality of touch-sensitive areas; and
   a controller in electrical communication with said flexible touch-sensitive layer and said flexible light emitting layer, said controller detecting touch events via input from said flexible touch-sensitive layer and directing at least one light output characteristic of said LED groups in correspondence with said touch events.

15. The LED-based lighting fixture of claim 14, wherein said flexible touch-sensitive layer includes a conductive foil divided into a plurality of separated segments to define said plurality of touch-sensitive areas.

16. The LED-based lighting fixture of claim 14, wherein said flexible touch-sensitive layer includes a conductive film atop a conductive foil, said conductive film divided into a plurality of segments to define said plurality of touch-sensitive areas.

17. The LED-based lighting fixture of claim 14, wherein each of said touch-sensitive areas is provided over and enabling control of a corresponding of said LED groups.

18. The LED-based lighting fixture of claim 14, further comprising a flexible diffusing layer provided over said flexible light emitting layer and diffusing light output generated by said LED groups.

19. The LED-based lighting fixture of claim 18, further comprising an outermost flexible protective layer provided over said flexible light emitting layer and said flexible touch-sensitive layer.

* * * * *